United States Patent
Matheny

(10) Patent No.: US 9,938,033 B2
(45) Date of Patent: Apr. 10, 2018

(54) SONOTRODE

(71) Applicant: EDISON WELDING INSTITUTE, INC., Columbus, OH (US)

(72) Inventor: Mitch Matheny, Columbus, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 22 days.

(21) Appl. No.: 15/343,896

(22) Filed: Nov. 4, 2016

(65) Prior Publication Data

US 2017/0297755 A1  Oct. 19, 2017

Related U.S. Application Data

(63) Continuation-in-part of application No. 15/343,407, filed on Nov. 4, 2016.

(60) Provisional application No. 62/324,061, filed on Apr. 18, 2016.

(51) Int. Cl.
| | |
|---|---|
| *B32B 37/00* | (2006.01) |
| *B65B 51/22* | (2006.01) |
| *B65B 51/30* | (2006.01) |
| *B65B 9/20* | (2012.01) |

(52) U.S. Cl.
CPC .............. *B65B 51/225* (2013.01); *B65B 9/20* (2013.01); *B65B 51/30* (2013.01)

(58) Field of Classification Search
CPC ......... B65B 51/225; B65B 9/20; B65B 51/30; B29C 65/08; B06B 1/06; B06B 3/00
USPC ............................................ 156/580.1, 580.2
See application file for complete search history.

(56) References Cited

U.S. PATENT DOCUMENTS

| | | | |
|---|---|---|---|
| 6,605,178 B1 | 8/2003 | Shinohara et al. | |
| 2005/0247408 A1 | 11/2005 | Jung | |
| 2008/0054051 A1* | 3/2008 | Sheehan | B23K 20/10 228/110.1 |
| 2009/0283570 A1* | 11/2009 | Gerdes | B29C 65/08 228/1.1 |
| 2010/0276061 A1* | 11/2010 | Oblak | B23K 20/10 156/73.1 |
| 2012/0012258 A1 | 1/2012 | Vogler | |
| 2015/0210002 A1 | 7/2015 | Short | |

OTHER PUBLICATIONS

International Search Report and Written Opinion of the International Searching Authority received in PCT/US2016/60615, dated Jan. 31, 2017.

* cited by examiner

*Primary Examiner* — James Sells
(74) *Attorney, Agent, or Firm* — Frost Brown Todd LLC

(57) ABSTRACT

A sonotrode that includes a sealing face; a front quarter wavelength region adjacent to the sealing face, wherein the front quarter wavelength region has been modified to increase the gain of the sonotrode; and a rear quarter wavelength region adjacent to the front quarter wavelength region, wherein the rear quarter wavelength region has been modified to create a non-uniform amplitude profile across the length of the sealing face of the sonotrode.

20 Claims, 5 Drawing Sheets

SONOTRODE

CROSS-REFERENCE TO RELATED APPLICATIONS

This patent application is a continuation-in-part of U.S. patent application Ser. No. 15/343,407 filed on Nov. 04, 2016 and entitled "Modular Ultrasonic Device for Use in Package Sealing Systems", which claimed the benefit of U.S. Provisional Patent Application Ser. No. 62/324,061 filed on Apr. 18, 2016 and entitled "Modular Ultrasonic Device for Use in Package Sealing Systems", the disclosures of which are hereby incorporated by reference herein in their entirety and made part of the present U.S. utility patent application for all purposes.

BACKGROUND OF THE INVENTION

The described invention relates in general to systems, devices, and methods for sealing bags and containers used with consumer packaged goods, and more specifically to ultrasonic systems, modular devices, and methods for manufacturing and/or assembling the packages used to contain food and other items.

The consumer packaged goods industry typically utilizes thin film materials coated with a thermally activated sealant layer, in combination with resistively heated thermal jaw systems, for sealing packages used to contain various food products. Thermal sealing technology is commonly used on packages that are between 2-12 inches in width and to maintain acceptable seal integrity for perishable products, the thermal seal region is oversized to reduce gas leak rates. However, these large thermal seal areas are known to still experience high rates of gas leakage. Large thermal seal areas also result in higher material costs and the high gas leak rate results in shorter shelf life for the products contained in this type of package. Additionally, currently used thermal sealing systems and methods are not capable of effectively sealing through even a minimal amount of food or other product that has entered the seal region of a package. This problem leads to higher factory scrap and an increased likelihood of delivering spoiled or unusable product to the consumer.

Previous attempts have been made to introduce ultrasonic sealing technology to consumer packaged goods with little or no adoption thereof by the industry. Current ultrasonic sealing technology does not provide a solution that can be used in mass production to seal thin or thick films having widths of over 12 inches. Ultrasonic sealing methods are available which allow for sealing limited package widths (e.g., up to 8 inches) using a single transducer, while sealing greater widths may be accomplished only by using multiple transducer systems. Most users of sealing systems require the flexibility to make seal widths between 2 and 12 inches (or greater) on a single machine without requiring tooling changes. Thus, there is an ongoing need for a package sealing technology that effectively creates non-leaking seals of greater widths while reducing the overall area of the seal to provide materials saving and cost savings.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first sonotrode is provided. This sonotrode includes a sealing face; a front quarter wavelength region adjacent to the sealing face, wherein the front quarter wavelength region has been modified to increase the gain of the sonotrode; and a rear quarter wavelength region adjacent to the front quarter wavelength region, wherein the rear quarter wavelength region has been modified to create a non-uniform amplitude profile across the length of the sealing face of the sonotrode.

In accordance with another aspect of the present invention, a second sonotrode is provided. This sonotrode includes an elongated sealing face; a front quarter wavelength region adjacent to the sealing face, wherein the front quarter wavelength region has been modified to increase the gain of the sonotrode; a rear quarter wavelength region adjacent to the front quarter wavelength region; wherein the rear quarter wavelength region has been modified to create a non-uniform amplitude profile across the length of the sealing face of the sonotrode; wherein the modification to the front quarter wavelength region includes reducing the mass of the front quarter wavelength region relative to the rear quarter wavelength region; and at least one tuning slot formed therein for further adjusting the amplitude profile of the sonotrode.

In yet another aspect of this invention, a third sonotrode is provided. This sonotrode includes an elongated sealing face; a front quarter wavelength region adjacent to the sealing face, wherein the front quarter wavelength region has been modified to increase the gain of the sonotrode; a rear quarter wavelength region adjacent to the front quarter wavelength region, wherein the rear quarter wavelength region has been modified to create a non-uniform amplitude profile across the length of the sealing face of the sonotrode; wherein the modification to the rear quarter wavelength region includes modifying the rear quarter wavelength region to include a non-uniform distribution of mass therein; wherein the modification to the front quarter wavelength region includes reducing the mass of the front quarter wavelength region relative to the rear quarter wavelength region and forming a step between the front quarter wavelength region and the rear quarter wavelength region; and a plurality of tuning slots formed therein for further adjusting the amplitude profile of the sonotrode.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
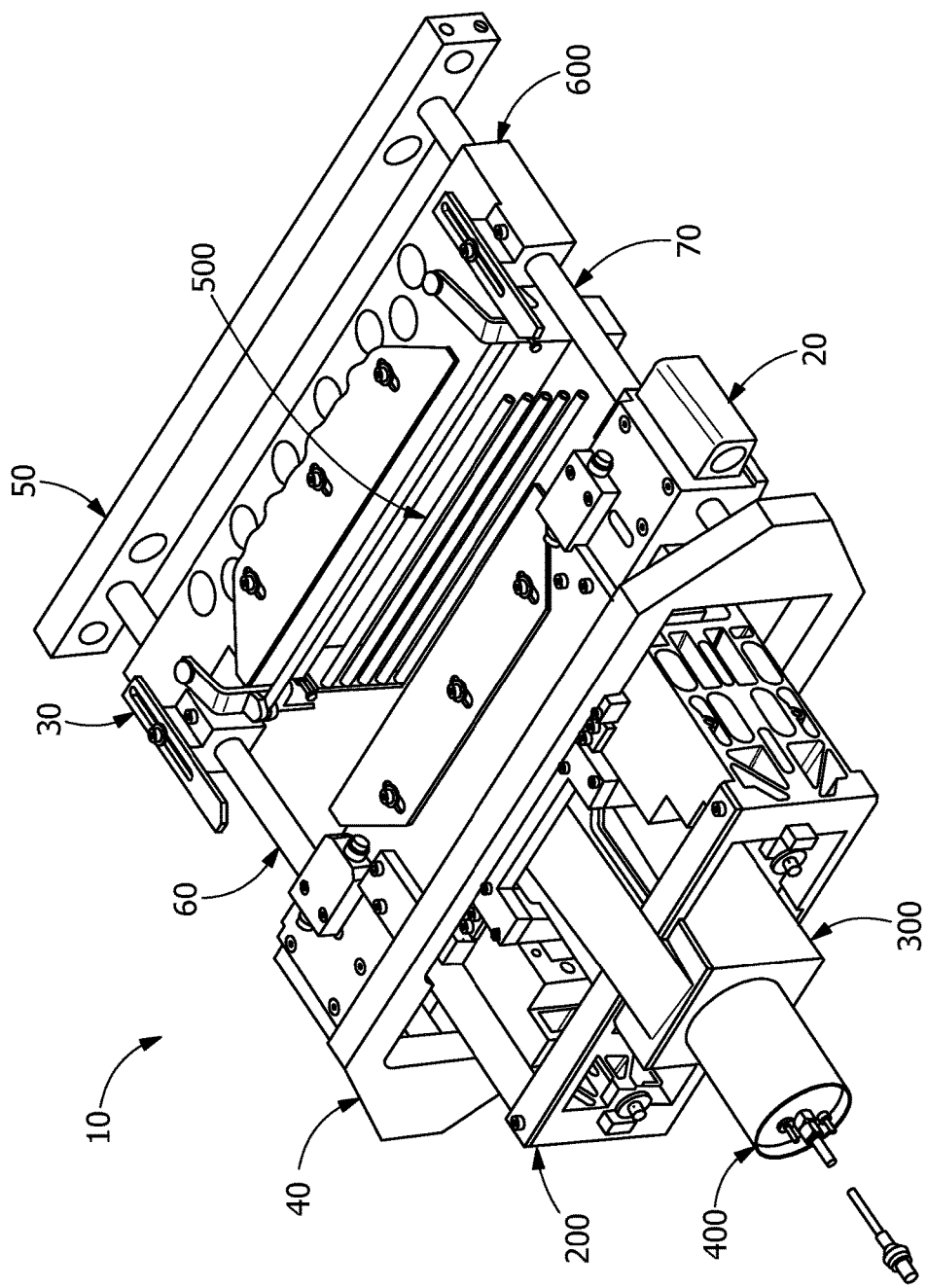
FIG. 1 is a perspective view of an ultrasonic sealing module in accordance with an exemplary embodiment of the present invention.
Figure 2:
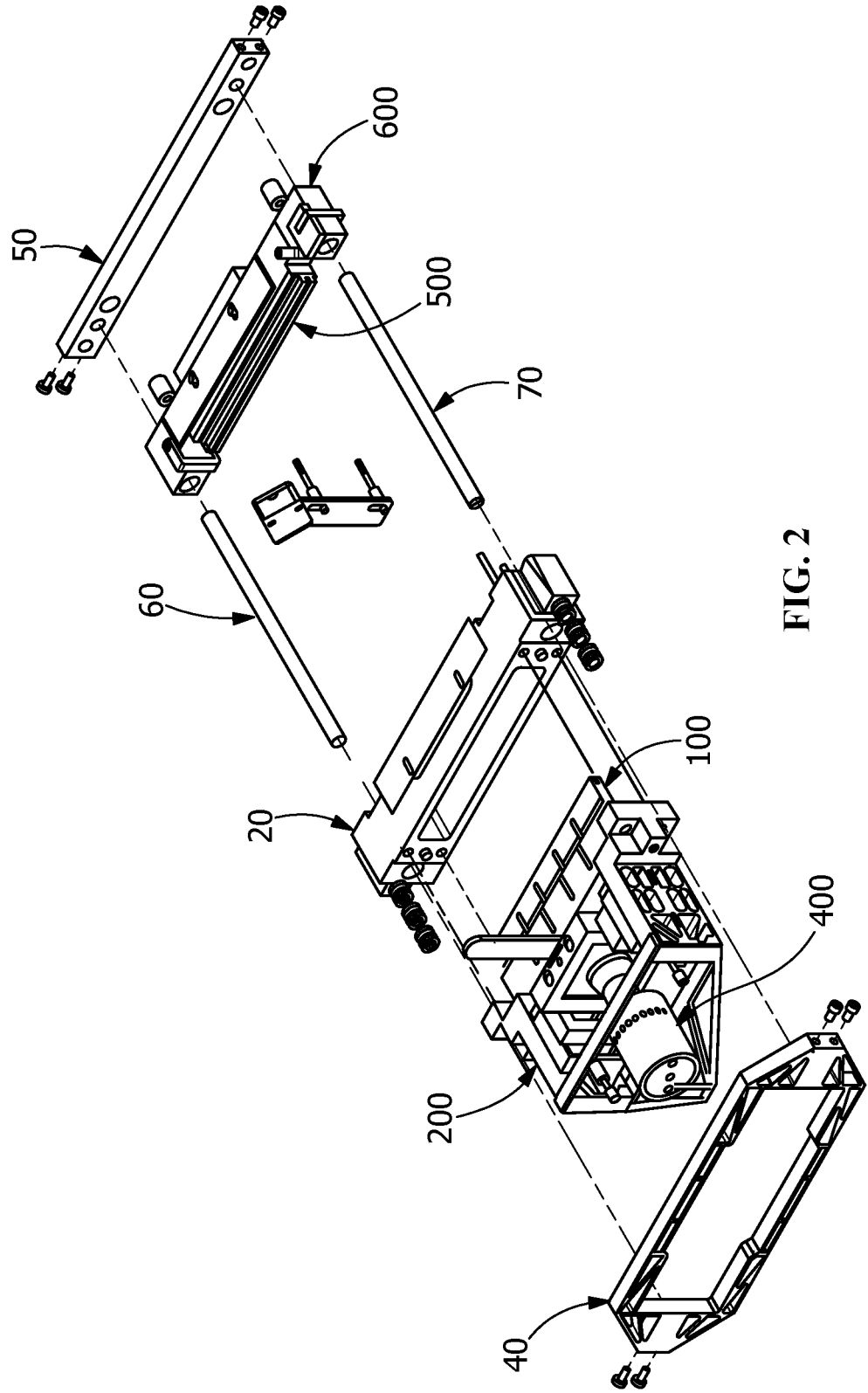
FIG. 2 is an exploded perspective view of the ultrasonic sealing module of FIG. 1.
Figure 3:
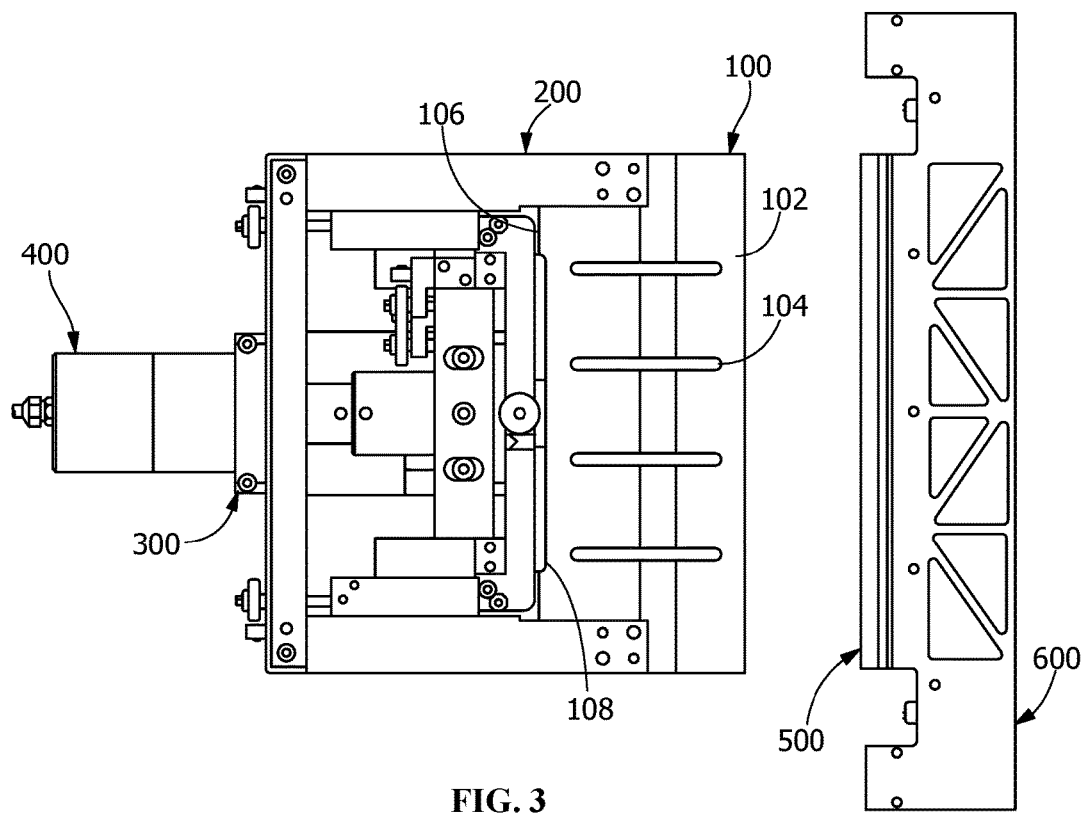
FIG. 3 is a top view of the modular ultrasonic package sealing device of FIG. 1.
Figure 4:
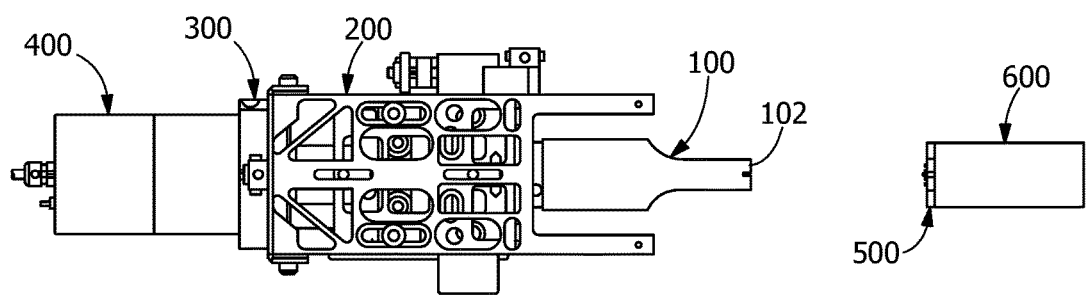
FIG. 4 is a side view of the modular ultrasonic package sealing device of FIG. 1.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates generally to systems, devices, and methods for sealing packages and the like, and more specifically to a modular device or apparatus for use in the ultrasonic sealing of packages, wherein seals of greater width (compared to prior art systems and devices) may be created while reducing the overall surface area of the seal and reducing gas leakage. When compared to thermal seals, ultrasonic seals meet or exceed the strength thereof and provide reduced gas leakage rates at significantly reduced seal sizes. Reducing seal size permits reduction of the overall package size, which results in the reduction of materials costs. Reducing the gas leak rate improves and extends the shelf life of perishable products. The present invention provides a modular ultrasonic bag sealing apparatus or device that may be used with various existing bag sealing systems and with newly designed bag sealing systems.

Figure 5:
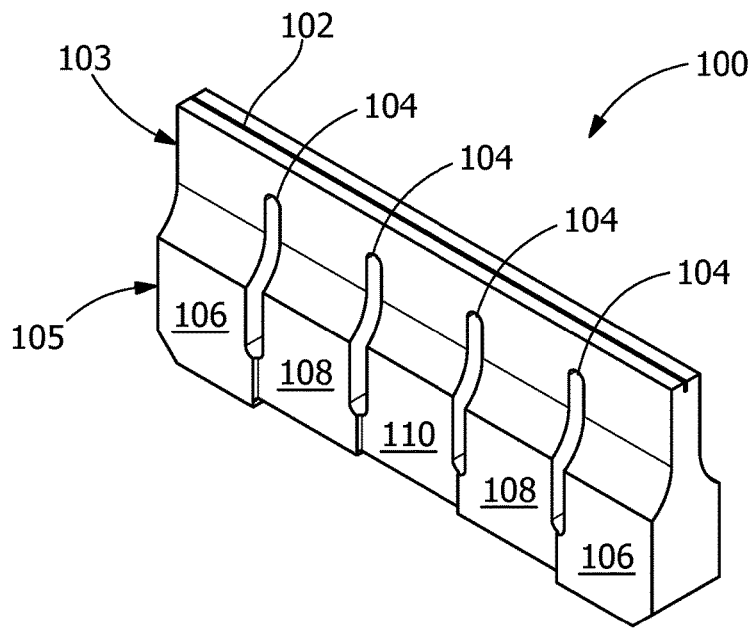
FIG. 5 is a top perspective view of an exemplary embodiment of the sonotrode component of the ultrasonic sealing module of the present invention.
Figure 6:
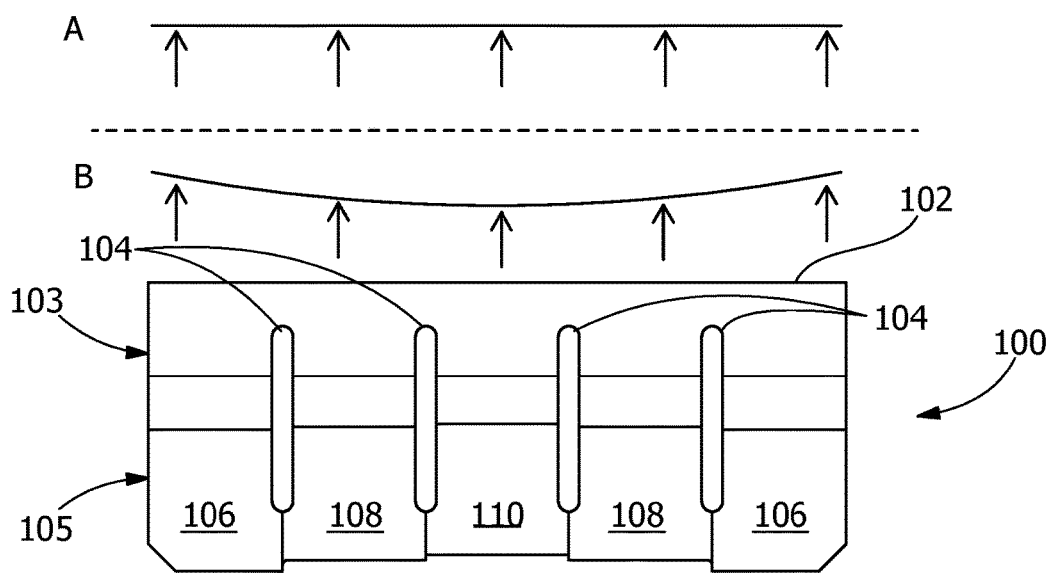
FIG. 6 is a top view of the sonotrode of FIG. 5 illustrating the appearance of a uniform amplitude profile (A) across the sealing face of the sonotrode and a non-uniform amplitude profile (B) across the sealing face of the sonotrode.
Figure 7:
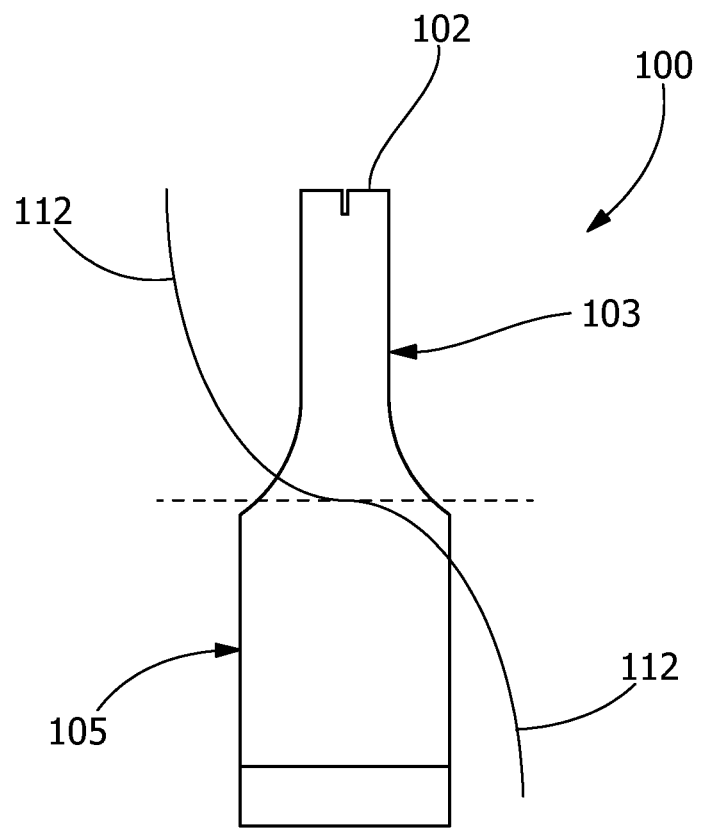
FIG. 7 is an end view of the sonotrode of FIG. 5 showing the amplitude of vibration through the front ¼ wavelength of the sonotrode and the rear ¼ wavelength of the sonotrode.

FIGS. 1-4 provide illustrations of an ultrasonic sealing module in accordance with an exemplary embodiment of the present invention. This device is intended for use in mass-production environments, but may be used in other environments, and is capable of sealing of a broad range of film thicknesses and widths. The device or apparatus depicted in the Figures may be retrofitted to commonly-used thermal sealing reciprocal bag makers or may be incorporated into new bag maker builds. The present invention is intended for vertical or horizontal form fill seal equipment (VFFS or HFFS), but could be applied to or adapted for use with virtually any type of packaging equipment. The modular aspect of this invention allows it to be connected to the existing end seal mechanical motion system of a commercially available bag making system. Mechanical self-leveling features included in ultrasonic sealing module of this invention permit the module to be adjusted as necessary following installation. In exemplary embodiments, the invention utilizes commercial off the shelf ultrasonic components including a power supply, transducer, and booster. With reference to FIGS. 5-7, the ultrasonic sealing module includes a sonotrode, uniquely designed anvil, and mechanical support system. The sonotrode is designed to provide reduced amplitude in the center of the sealing face region of the sonotrode, which is significantly different from the common ultrasonic practice of using a sonotrode with uniform amplitude across the width of the sealing face. The ultrasonic sonotrode can be over 12 inches wide and is energized by a single ultrasonic transducer, which facilitates sealing packages of various sizes without requiring a tooling change. Much wider seams can be created with this invention as compared to prior art systems and devices.

Again with reference to the Figures, FIGS. 1-4 provide various alternate views of exemplary ultrasonic sealing module 10, which includes first sealing member or "front jaw" 20 and a second sealing member or "rear jaw" 30; front mounting plate 40; rear mounting plate 50; first guide shaft 60; and second guide shaft 70. FIGS. 5-7 provide alternate views of exemplary ultrasonic horn or sonotrode 100, which includes leading edge or sealing face 102; front ¼ wavelength region 103; tuning slots 104; rear ¼ wavelength region 105; outer edges 106 of rear ¼ wavelength region 105; first modified area 108 of rear ¼ wavelength region 105; and second modified area 110 of rear ¼ wavelength region 105. Sonotrode 100 is secured within mounting frame 200, upon which stack mount 300 and ultrasonic transducer 400 are also mounted. Ultrasonic transducer 400 provides a predetermined amount of ultrasonic energy to sonotrode 100 when ultrasonic sealing module 10 is in operation. Rear jaw 30 includes anvil 500, which is mounted on frame 600, which in turn is slidably mounted on first guide shaft 60 and second guide shaft 70. Sonotrode 100 is disposed within front jaw 20, which cooperates with anvil 500 on rear jaw 30 to seal packages when ultrasonic sealing module 10 is in operation.

As shown in FIGS. 5-6, horn or sonotrode 100, which may be manufactured from high-strength aluminum alloys, titanium, or other suitable materials, has been modified to provide a variable or non-uniform amplitude profile across sealing face 102. FIG. 7 is an end view of sonotrode 100 showing the direction of the amplitude of vibration 112 through the front ¼ wavelength of sonotrode 100 and the rear ¼ wavelength of sonotrode 100. With regard to the general design of sonotrode 100, front ¼ wavelength region 103 includes a significant mass reduction (or step configuration) for increasing the gain of sonotrode 100 and rear ¼ wavelength region 105 has been modified to include discrete areas of varying thicknesses. As illustrated by the exemplary embodiment shown in FIGS. 5-6, rear ¼ wavelength region 105 includes left and right outer edges 106 of rear ¼ wavelength 105; left and right first modified regions 108 of rear ¼ wavelength 105; and second modified area 110 of rear ¼ wavelength region 105. The decreasing and/or variable thickness and height of these areas creates the non-uniform amplitude profile shown as line B in FIG. 6, as opposed to the uniform amplitude profile shown as line A in FIG. 6. Tuning slots 104 permit further tuning of sonotode 100, as desired or as necessary. The number of tuning slots 104, as well as the length, width, and specific geometry of tuning slots 104 may be changed or modified as desired or as necessary. The exemplary configuration of sonotrode 100 shown in the Figures, results in the amplitude profile of the center portion of sealing face 102 being 10-20% (for example) lower than the outer regions of sealing face 102. Reducing or lowering the amplitude in the center of sealing face 102 permits the effective sealing of the back seal region of a package, which typically includes three layers of packaging material that form a seam. Because there are three layers present in the back seal region, this region inherently experiences a higher force per unit area, which is undesirable. Accordingly, the amplitude is lowered in the middle of the sonotrode of this invention to counter the effect of the higher force per unit area. In other embodiments of this invention, the non-uniform amplitude profile includes an amplitude that is greater in the center of the sealing face than at the outer edges thereof.

In an ultrasonic seal [force×amplitude=energy], therefore if forces are higher, the amplitude may be lowered to achieve a uniform energy input along the width of the sealed region. Also, if a back seal region is hot as a result of recent thermal sealing, less energy will be required to form an ultrasonic end seal over the back seal region. The sonotrode is hottest in the center of the sealing face due to thermal transfer in bulk material as opposed to thermal transfer into the air at the edges of the sonotrode and the center of the sealing face is where the back seal region typically resides. Essentially, the sonotrode of the present invention provides varying amplitudes across the face of sonotrode for effectively welding multiple (e.g., three) layers of thin film to one another to form a seal. Prior art sonotrodes which provide a uniform amplitude distribution across the sealing face thereof create overwelding in the back seal region of a package, which is an undesirable outcome that the present invention overcomes.

The modular ultrasonic package sealing device of this invention is capable of producing ultrasonic seals below 2 inches in width and over 12 inches in width with no required tooling changes. A change in package width or material thickness does not require a tool change. This invention can seal packages which include the thin films commonly used in the snack package industry as well as thicker films used to package consumer products or foods such as produce, poultry, or dairy. The ultrasonic seals created with this invention are smaller in size than thermal seals, which permits a reduction in the required amount of packaging material. The ultrasonic sealing process of this invention also provides an improvement in sealing through minimal snack product (e.g., chips, salt, grease, etc.), which reduces in process scrap at the factory, and prevents or reduces the likelihood of spoiled or bad product from reaching the consumer. The improved ability to seal through snack product also allows for a reduction in package headspace, which further reduces overall material use. The ultrasonic seals created with this invention have been tested in mass-production environments (e.g., millions of packages sealed) and proven to have a lower gas (e.g., oxygen) leak rate when compared to traditional thermal seals. A lower gas transfer rate results in a longer product shelf life.

Other advantages of the present invention include a modular mechanical structure that supports the ultrasonic jaws of the device. This aspect facilitates retrofitting an existing bag maker equipment or incorporation into new bag maker builds and provides a mechanical structure that attaches to existing bag maker motion system so no ancillary motors or other motion devices are required. This invention provides: (i) a system that can seal thin films at high volume production rates without damage to ultrasonic components; (ii) a dual force system (spring or pneumatic) that provides minor compensation for self-leveling; and (iii) mechanical alignment features that allow the sonotrode and anvil weld faces to be parallel to one another other. This arrangement permits the very fine adjustments involved in leveling the sonotrode and anvil sealing faces used for thin film sealing, across a wide sealing face.

A further advantage of the present invention is its usefulness in the packaging of products that include chocolate or similar substances. Current packaging systems and methodologies used with products of this nature utilize a "cold seal" approach, wherein a pressure sensitive adhesive, similar to rubber cement, is applied to the sealing surfaces of the package and then pressed together. Because the ultrasonic sealing technology used with the present invention does not generate high heat in the sealing area, it can be used to replace cold seals in product packages that contain chocolate, thereby significantly reducing the cost of the package. As with other applications of this invention, the seal area can also be reduced, thereby contributing to reduced packaging material and material costs.

While the present invention has been illustrated by the description of exemplary embodiments thereof, and while the embodiments have been described in certain detail, it is not the intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A sonotrode, comprising:
   (a) a sealing face;
   (b) a front quarter wavelength region adjacent to the sealing face, wherein the front quarter wavelength region has been modified to increase the gain of the sonotrode; and
   (c) a rear quarter wavelength region adjacent to the front quarter wavelength region, wherein the rear quarter wavelength region has been modified to create a non-uniform amplitude profile across the length of the sealing face of the sonotrode.

2. The sonotrode of claim 1, wherein the sonotrode further includes at least one tuning slot formed therein for further adjusting the amplitude profile of the sonotrode.

3. The sonotrode of claim 1, wherein the modification to the front quarter wavelength region includes reducing the mass of the front quarter wavelength region relative to the rear quarter wavelength region.

4. The sonotrode of claim 1, wherein the modification to the front quarter wavelength region includes forming a step between the front quarter wavelength region and the rear quarter wavelength region.

5. The sonotrode of claim 1, wherein the modification to the rear quarter wavelength region includes modifying the rear quarter wavelength region to include a non-uniform distribution of mass therein.

6. The system of claim 1, wherein the rear quarter wavelength region has been modified to include areas of varying thickness and areas of varying height formed therein for creating the non-uniform amplitude profile across the sealing face of the sonotrode.

7. The system of claim 1, wherein the non-uniform amplitude profile includes a region of lower amplitude in the center of the sealing face and regions of higher amplitude on the outer edges of the sealing face.

8. The system of claim 1, wherein the amplitude in the center of the sealing face is 10-20% lower than the amplitude at the outer edges of the sealing face.

9. The sonotrode of claim 1, wherein the non-uniform amplitude profile includes an amplitude that is greater in the center of the sealing face than at the outer edges thereof.

10. The sonotrode of claim 1, wherein the sonotrode is adapted for use in an ultrasonic module for use in a package sealing machine, wherein the package sealing machine is a vertical form fill sealing machine or a horizontal form fill sealing machine, and wherein the ultrasonic module includes:
(a) a moveable front jaw adapted to receive the sonotrode;
(b) a moveable rear jaw;
(c) an anvil mounted on the rear jaw opposite the sonotrode, wherein the anvil mechanically cooperates with the sonotrode to seal a package;
(d) an ultrasonic transducer, wherein the ultrasonic transducer provides a predetermined amount ultrasonic energy to the sonotrode;
(e) a supportive frame on which the front jaw and the sonotrode are mounted; and
(f) first and second guide shafts connected to the front jaw upon which the rear jaw is slidably mounted.

11. A sonotrode, comprising:
(a) an elongated sealing face;
(b) a front quarter wavelength region adjacent to the sealing face, wherein the front quarter wavelength region has been modified to increase the gain of the sonotrode;
(c) a rear quarter wavelength region adjacent to the front quarter wavelength region;
(d) wherein the rear quarter wavelength region has been modified to create a non-uniform amplitude profile across the length of the sealing face of the sonotrode;
(e) wherein the modification to the front quarter wavelength region includes reducing the mass of the front quarter wavelength region relative to the rear quarter wavelength region; and
(f) at least one tuning slot formed therein for further adjusting the amplitude profile of the sonotrode.

12. The sonotrode of claim 11, wherein the modification to the front quarter wavelength region further includes forming a step between the front quarter wavelength region and the rear quarter wavelength region.

13. The sonotrode of claim 11, wherein the modification to the rear quarter wavelength region includes modifying the rear quarter wavelength region to include a non-uniform distribution of mass therein.

14. The system of claim 11, wherein the rear quarter wavelength region has been modified to include areas of varying thickness and areas of varying height formed therein for creating the non-uniform amplitude profile across the sealing face of the sonotrode.

15. The system of claim 11, wherein the non-uniform amplitude profile includes a region of lower amplitude in the center of the sealing face and regions of higher amplitude on the outer edges of the sealing face.

16. The system of claim 11, wherein the amplitude in the center of the sealing face is 10-20% lower than the amplitude at the outer edges of the sealing face.

17. The sonotrode of claim 11, wherein the non-uniform amplitude profile includes an amplitude that is greater in the center of the sealing face than at the outer edges thereof.

18. The sonotrode of claim 11, wherein the sonotrode is adapted for use in an ultrasonic module for use in a package sealing machine, wherein the package sealing machine is a vertical form fill sealing machine or a horizontal form fill sealing machine, and wherein the ultrasonic module includes:
(a) a moveable front jaw adapted to receive the sonotrode;
(b) a moveable rear jaw;
(c) an anvil mounted on the rear jaw opposite the sonotrode, wherein the anvil mechanically cooperates with the sonotrode to seal a package;
(d) an ultrasonic transducer, wherein the ultrasonic transducer provides a predetermined amount ultrasonic energy to the sonotrode;
(e) a supportive frame on which the front jaw and the sonotrode are mounted; and
(f) first and second guide shafts connected to the front jaw upon which the rear jaw is slidably mounted.

19. A sonotrode, comprising:
(a) an elongated sealing face;
(b) a front quarter wavelength region adjacent to the sealing face, wherein the front quarter wavelength region has been modified to increase the gain of the sonotrode;
(c) a rear quarter wavelength region adjacent to the front quarter wavelength region, wherein the rear quarter wavelength region has been modified to create a non-uniform amplitude profile across the length of the sealing face of the sonotrode;
(d) wherein the modification to the rear quarter wavelength region includes modifying the rear quarter wavelength region to include a non-uniform distribution of mass therein;
(e) wherein the modification to the front quarter wavelength region includes reducing the mass of the front quarter wavelength region relative to the rear quarter wavelength region and forming a step between the front quarter wavelength region and the rear quarter wavelength region; and
(f) a plurality of tuning slots formed therein for further adjusting the amplitude profile of the sonotrode.

20. The sonotrode of claim 19, wherein the sonotrode is adapted for use in an ultrasonic module for use in a package sealing machine, wherein the package sealing machine is a vertical form fill sealing machine or a horizontal form fill sealing machine, and wherein the ultrasonic module includes:
(a) a moveable front jaw adapted to receive the sonotrode;
(b) a moveable rear jaw;
(c) an anvil mounted on the rear jaw opposite the sonotrode, wherein the anvil mechanically cooperates with the sonotrode to seal a package;
(d) an ultrasonic transducer, wherein the ultrasonic transducer provides a predetermined amount ultrasonic energy to the sonotrode;
(e) a supportive frame on which the front jaw and the sonotrode are mounted; and
(f) first and second guide shafts connected to the front jaw upon which the rear jaw is slidably mounted.

* * * * *